United States Patent
Takijiri

(10) Patent No.: US 9,459,629 B2
(45) Date of Patent: Oct. 4, 2016

(54) FLOW RATE CONTROLLER AND RECORDING MEDIUM RECORDED WITH PROGRAM FOR FLOW RATE CONTROLLER

(71) Applicant: HORIBA STEC, Co., Ltd., Kyoto-shi, Kyoto (JP)

(72) Inventor: Kotaro Takijiri, Kyoto (JP)

(73) Assignee: HORIBA STEC, Co., Ltd., Kyoto-shi (JP)

( * ) Notice: Subject to any disclaimer, the term of this patent is extended or adjusted under 35 U.S.C. 154(b) by 267 days.

(21) Appl. No.: 14/026,907

(22) Filed: Sep. 13, 2013

(65) Prior Publication Data

US 2014/0076424 A1 Mar. 20, 2014

(30) Foreign Application Priority Data

Sep. 14, 2012 (JP) ................................ 2012-202843

(51) Int. Cl.
*F16K 31/12* (2006.01)
*G05D 7/06* (2006.01)

(52) U.S. Cl.
CPC .......... *G05D 7/0617* (2013.01); *G05D 7/0635* (2013.01); *Y10T 137/7759* (2015.04)

(58) Field of Classification Search
CPC ............. G05D 7/0635; G05D 7/0623; G05D 7/0617; Y10T 137/7759; Y10T 137/776; Y10T 137/7761
See application file for complete search history.

(56) References Cited

U.S. PATENT DOCUMENTS

| 6,802,333 | B2* | 10/2004 | Balazy | ................. | G05D 7/0635 137/110 |
| 7,650,903 | B2* | 1/2010 | Yamamoto | ............ | F16K 31/126 137/487.5 |
| 2007/0131282 | A1* | 6/2007 | Mohammed | .............. | F16K 7/17 137/487.5 |
| 2011/0155264 | A1* | 6/2011 | Minami | ............... | G05D 11/138 137/467.5 |

(Continued)

FOREIGN PATENT DOCUMENTS

| JP | 02151027 A | 6/1990 |
| JP | H02277539 A | 11/1990 |
| JP | H04047416 A | 2/1992 |
| JP | H10232714 A | 9/1998 |
| JP | 2002041149 A | 2/2002 |
| JP | 2007034550 A | * 2/2007 |

OTHER PUBLICATIONS

Machine Translation of JP2007034550 (retrieved Feb. 29, 2016).*

(Continued)

*Primary Examiner* — Jessica Cahill
(74) *Attorney, Agent, or Firm* — Alleman Hall McCoy Russell & Tuttle LLP

(57) ABSTRACT

A flow rate controller is provided that includes a setting flow rate shaping part that, in the case of receiving an input setting flow rate having a discontinuous point at which a target value discontinuously changes from a first target value to a second target value, outputs a shaped setting flow rate in which a continuously changing interval is inserted in place of the discontinuous point in the input setting flow rate; and a valve control part that controls a flow rate control valve opening so as to reduce a deviation between the shaped setting flow rate and a measured flow rate, wherein the setting flow rate shaping part is configured to, depending on the magnitude of an absolute deviation between the first target value and the second target value in the input setting flow rate, change a rate of change in target value in the continuously changing interval.

7 Claims, 7 Drawing Sheets

(56) References Cited

U.S. PATENT DOCUMENTS

2012/0116596 A1* 5/2012 Yoneda ................ G05D 7/0635
 700/282
2012/0209436 A1* 8/2012 Takijiri ................ G05D 7/0635
 700/282

OTHER PUBLICATIONS

Japanese Patent Office, Office Action Issued in Japanese Patent Application No. 2012202843, Jan. 5, 2016, 4 pages.

* cited by examiner

FLOW RATE CONTROLLER AND RECORDING MEDIUM RECORDED WITH PROGRAM FOR FLOW RATE CONTROLLER

TECHNICAL FIELD

This invention relates to a flow rate controller that controls a flow rate of, for example, a gas or the like used for a semiconductor process, and a recording medium comprising a control program for the flow rate controller.

BACKGROUND ART

At the time of supplying gas to a semiconductor manufacturing chamber, a flow rate controller is inputted with, for example, an input setting flow rate of which a target value is changed stepwise, and thereby flow rate control is performed. In the past, regarding a response to such step input, how accurately an actual flow rate follows a setting flow rate in a stable state has been regarded as important as flow rate accuracy; however, in recent years, even in a transient response state, high flow rate accuracy has been additionally required.

That is, in the field of semiconductor manufacturing, an overshoot amount, a target response time required to reach a stable state from a transient response state, upper and lower limit flow rate values at each time in the transient response state, and the like are also provided with strict limitations, and therefore it is necessary to manage each flow rate controller in terms of accuracy so as to meet such required values.

In order to respond to such requirements, in a production stage of a flow rate controller, in order to adjust an individual variation among respective flow rate controllers, for example, PID parameters are adjusted on an individual flow rate controller to deliver the flow rate controller.

However, meeting required accuracy particularly in the transient response state by adjusting such control parameters has a limitation for the following reasons.

First, the adjustments of the PID parameters and the like should be made by trial and error, and in the case of attempting to strictly meet accuracy even in the transient response state, it may be difficult to make the adjustments within an adjustment time determined by restriction of production efficiency and the like.

Also, even in the case where the PID parameters can be adjusted under predetermined conditions, for example, if a parameter such as an upstream side pressure, temperature, or setting flow rate is changed, a step response also changes, and therefore the required accuracy in the transient response state may not be met. That is, by only adjusting the PID parameters, it may be difficult to keep a pattern of the step response, which is determined by the overshoot amount, target response time, and the like, within a desired range under conditions such as a setting of flow rates having different magnitudes.

Meanwhile, in addition to an approach for attempting to achieve desired flow rate accuracy by adjusting the PID parameters as described, for example, as disclosed in Patent Literature 1, there is also a method that converts an input setting flow rate inputted by a user, in which a target value changes stepwise, to a setting flow rate in which a changed target value makes it easy to obtain a preferable response, and then performs flow rate control.

Specifically, a flow rate controller described in Patent Literature 1 is one that is provided with a target value shaping part that, in the case of receiving an input setting value of which a target value changes stepwise, outputs a shaped setting flow rate in which in place of a discontinuous part, a continuously changing interval in which a target value changes rampwise is inserted, and feeds back a deviation between the shaped setting flow rate and a measured flow rate to thereby perform flow rate control.

As described, the flow rate controller attempts to, by eliminating the part where the target value discontinuously changes, and changing the target value rampwise, improve followability of an actual flow rate in a transient response.

However, even in the case of, as disclosed in Patent Literature 1, performing the flow rate control with use of the shaped setting flow rate obtained by simply replacing the discontinuous part of the input setting flow rate with a ramp function, if there is a difference in magnitude of a final target value, or the like as described above, it is difficult to meet all of constraint conditions such as a required target response time.

CITATION LIST

Patent Literature

Patent Literature 1: JPA02-151027

SUMMARY OF INVENTION

Technical Problem

The present invention is made in consideration of the problems as described above, and intended to provide a flow rate controller that, independently of preconditions such as the magnitude of a final target value in an input setting flow rate, enables a flow rate of fluid actually flowing to meet constraint conditions such as a desired overshoot amount and target response time.

Solution to Problem

That is, a flow rate controller according to the present invention is provided with: a flow rate sensor that is provided in a flow path through which fluid flows; a flow rate control valve that is provided in the flow path; a setting flow rate shaping part that, in the case of receiving an input setting flow rate in which an absolute value of a deviation between a first target value and a second target value changes by a reference value or more within a reference time, outputs a shaped setting flow rate formed with a continuously changing interval in which from the first target value to the second target value, a continuous change is made over a predetermined period of time; and a valve control part that controls an opening level of the flow rate control valve so as to reduce a deviation between the shaped setting flow rate outputted from the setting flow rate shaping part and a measured flow rate measured by the flow rate sensor, wherein the setting flow rate shaping part is configured to, depending on magnitude of an absolute value of a deviation between the first target value and the second target value in the received input setting flow rate, change an amount of change in target value per unit time in the continuously changing interval.

Note that "discontinuously changing with time" means that a target value changes by the reference value or more within the reference time such as a control cycle. Conversely, "continuously changing" means that the target value changes only by the reference value or less within the reference time such as the control cycle.

Also, the "reference time" and the "reference value" are values determined on the basis of, for example, control characteristics of the flow rate controller, and are determined on the basis of whether or not, in the case where a change from the first target value to the second target value is made, the target value can be followed with predetermined accuracy.

If so, the setting flow rate shaping part changes the amount of change in target value per unit time in the continuously changing interval depending on the magnitude of the absolute value of the deviation between the first and second target values in the received input setting flow rate, and therefore the opening level of the flow rate control valve can be controlled in a most appropriate mode depending on the magnitude of a flow rate to be actually changed.

In a region where the flow rate to be actually changed is large, and overshoot is unlikely to occur, in order to achieve a stable state from a transient response state in a short period of time, and also, in a region where the flow rate to be actually changed is small, and the stable state is achieved from the transient response state in a short period of time, in order to make the overshoot unlikely to occur to perform desired flow rate control even in the case of any input setting flow rate, it is only necessary that the setting flow rate shaping part is configured to increase an absolute value of the amount of change in target value per unit time in the continuously changing interval, as the absolute value of the deviation between the first target value and the second target value in the received input setting flow rate is increased.

In order to decrease a calculation load at the time of generating the shaped setting flow rate from the input setting flow rate in the setting flow rate shaping part, and make it easy to implement the shaped setting flow rate, and also in order to make it possible to obtain desired flow rate control characteristics even in the case where a final target value is any value, it is only necessary that the target value in the continuously changing interval is represented by a linear expression using time as a variable; and the setting flow rate shaping part is configured to increase an absolute value of a slope of the linear expression, as the absolute value of the deviation between the first target value and the second target value is increased.

Even in the case where the flow rate to be actually changed is large, in order to enable a target response time from the transient response state to the stable state to be made very short, and also in order to prevent the overshoot or the like from occurring, it is only necessary that the setting flow rate shaping part is configured to change the absolute value of the slope of the linear expression at a point of time when the measured flow rate measured by the flow rate sensor reaches a threshold flow rate value after flow rate control based on the target value in the continuously changing interval has been started.

According to the present invention, specific application examples of enabling desirable flow rate control characteristics at the start of the flow rate control, and also enabling a reduction in variation in flow rate control characteristics of each of the flow rate control devices include one where in the input setting flow rate, a target value changes stepwise; and the setting flow rate shaping part outputs the shaped setting flow rate in which the target value in the continuously changing interval changes rampwise.

In order to set the amount of change in target value per unit time in the continuously changing interval to enable most appropriate flow rate control to be performed for each magnitude of an absolute value of a deviation between first and second target values, it is only necessary that the setting flow rate shaping part is configured to, in the continuously changing interval, set an amount of change in target value per unit time at a time when the measured flow rate measured by the flow rate sensor is included within an allowable flow rate region prescribed by an upper limit flow rate value and a lower limit flow rate value at each time.

In order to realize a flow rate controlling method of the present invention in an existing flow rate controller by retrofitting, it is only necessary that a recording medium recorded with a program used for a flow rate controller that is provided with a flow rate sensor provided in a flow path through which fluid flows, and a flow rate control valve provided in the flow path is used, and that the program is provided with: a setting flow rate shaping part that, in the case of receiving an input setting flow rate in which an absolute value of a deviation between respective target values from a first target value to a second target value changes by a reference value or more within a reference time, outputs a shaped setting flow rate formed with a continuously changing interval in which a target value continuously changes from the first target value to the second target value over a predetermined period of time; and a valve control part that controls an opening level of the flow rate control valve so as to reduce a deviation between the shaped setting flow rate outputted from the setting flow rate shaping part and a measured flow rate measured by the flow rate sensor, wherein the setting flow rate shaping part is configured to, depending on a magnitude of an absolute value of a deviation between the first target value and the second target value in the received input setting flow rate, change an amount of change in a target value per unit time in the continuously changing interval. It is only necessary to use the recording medium recorded with such a program to install the flow rate controller program of the present invention in a computer constituting the existing flow rate controller. In addition, examples of the recording medium include a CD-R, DVD, flash memory, or the like.

Advantageous Effects of Invention

As described, according to the flow rate controller of the present invention, the opening level of the flow rate control valve is controlled on the basis of the shaped setting flow rate having the continuously changing interval in which for example, depending on the deviation between the first and second target values, the target value changes in a different mode, and therefore even in the case where any input setting flow rate is inputted by a user, transient response characteristics can be made to have required accuracy.

DESCRIPTION OF REFERENCE CHARACTERS

Figure 1:
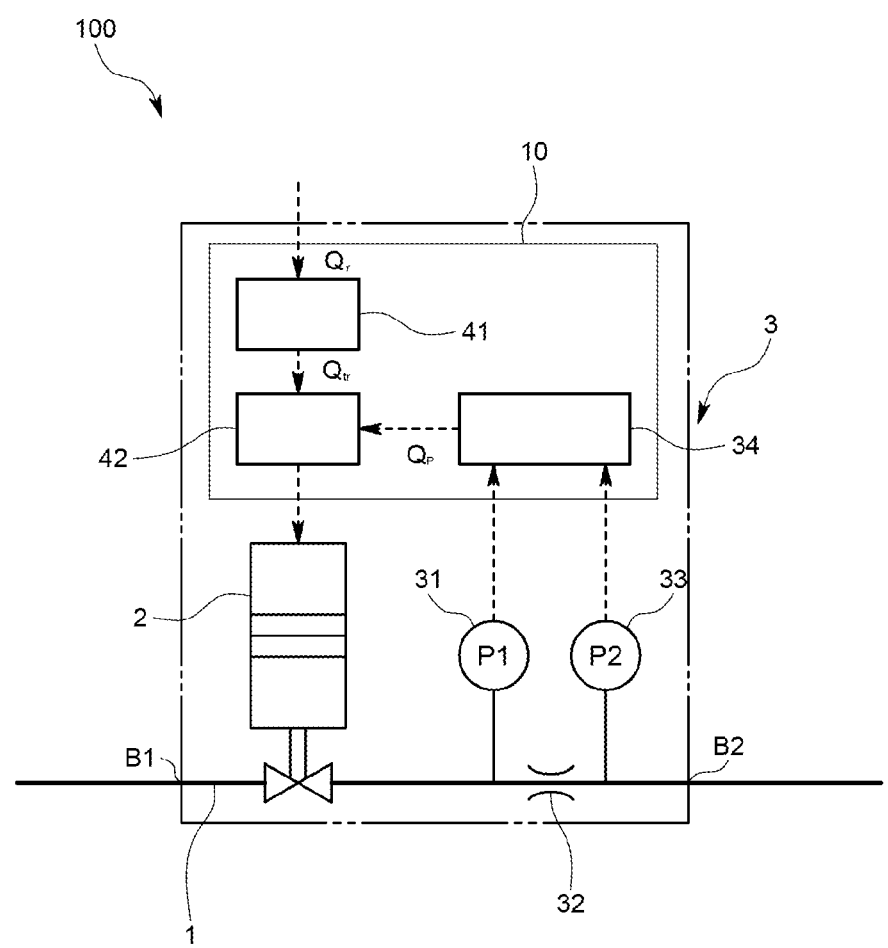
FIG. 1 is a schematic fluid circuit diagram of a flow rate controller according to a first embodiment of the present invention.

100: Flow rate controller
10: Information processing mechanism
1: Flow path
2: Flow rate control valve
31: First pressure sensor
32: Fluid resistor
33: Second pressure sensor
34: Flow rate calculation part
41: Setting flow rate shaping part
42: Valve control part
B: Board block
B1: Introduction port
B2: Lead-out port
BP: Attachment surface

DESCRIPTION OF EMBODIMENTS

In the following, a first embodiment of the present invention is described referring to drawings. A flow rate controller 100 of the first embodiment is a so-called mass flow controller, which is one that is used in a semiconductor manufacturing process to introduce a gas such as a material gas at a predetermined flow rate for evaporation onto a substrate in a vacuum chamber kept at a vacuum.

Figure 2:
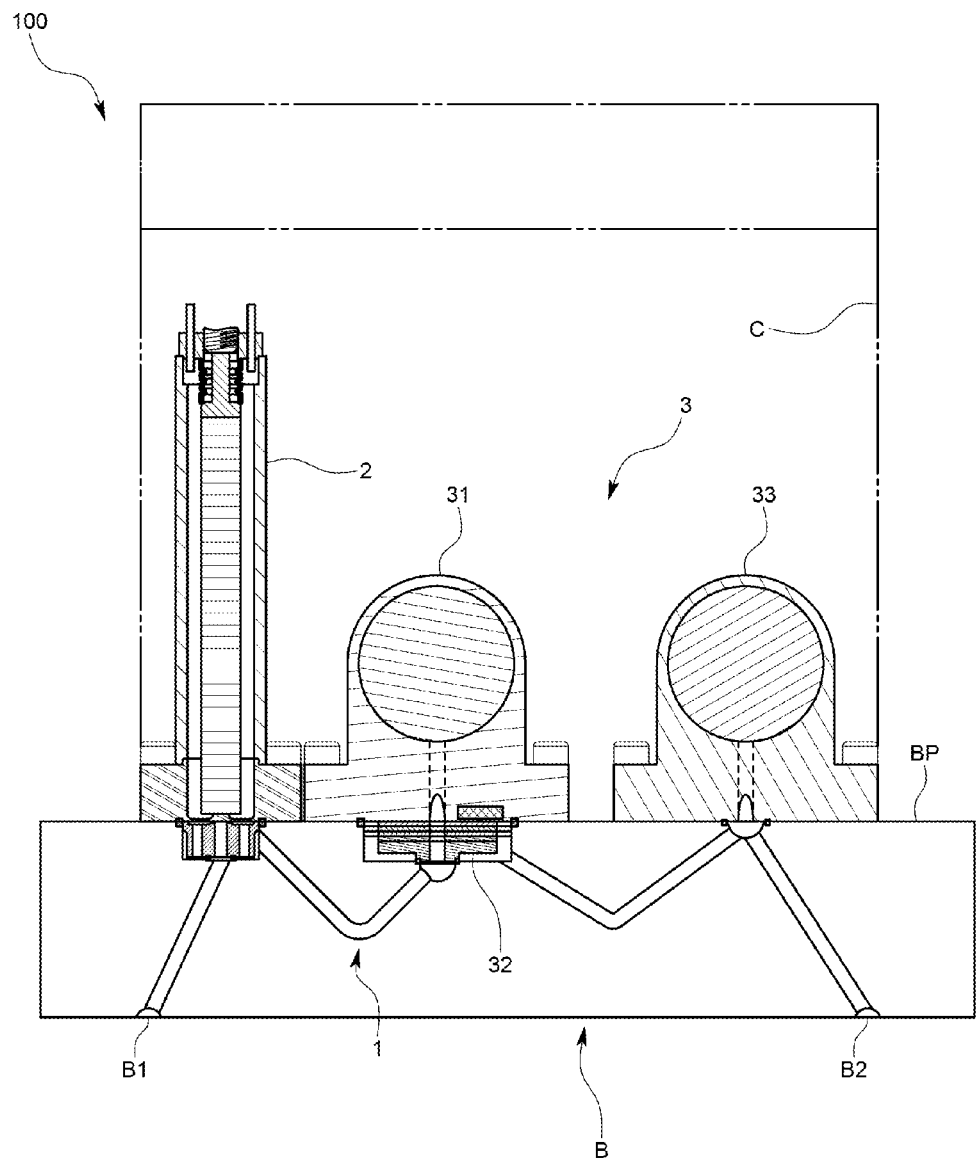
FIG. 2 is a schematic cross-sectional view illustrating a hardware configuration of the flow rate controller of the first embodiment.

As illustrated in a fluid circuit diagram of FIG. 1 and a cross-sectional view of FIG. 2, in the flow rate controller 100, hardware and software for flow rate control are configured as one module, and by connecting the module to a pipe through which the material gas flows, the flow rate controller 100 is configured to fulfill a flow rate control function.

More specifically, the flow rate controller 100 is configured to include: a substantially rectangular parallelepiped shaped board block B inside which a flow path 1 is formed; various types of fluid control devices attached to an upper surface of the board block B being made to serve as an attachment surface BP; an information processing mechanism 10 that controls the various types of fluid control devices; and a casing C that contains on its inside the information processing mechanism 10 and the various types of fluid control devices coupled to the attachment surface BP.

The board block B is provided with: an introduction port B1 into which fluid is introduced inside on a bottom surface opposite to the attachment surface BP; and a lead-out port B2 from which the fluid having passed through the various types of fluid control devices is led outside. Also, the flow path 1 inside the board block B is formed so as to, between the introduction port B1 and the lead-out port B2, travel in an elongate direction of the board block B, and also open at three positions of the attachment surface BP. Further, the introduction port B1 and the lead-out port B2 formed on the bottom surface of the board block B are respectively connected with connecting blocks (not illustrated) inside which flow paths 1 are formed, and thereby a gas panel system for a semiconductor manufacturing process is formed.

The fluid control devices include a flow rate control valve 2, first pressure sensor 31, fluid resistor 32, and second pressure sensor 33, which are sequentially attached on the attachment surface BP from an upstream side of the flow path 1 in this order. The respective fluid control devices are attached so as to respectively block the opening parts of the flow path 1 on the attachment surface BP.

The flow rate control valve 2 is one that adjusts a flow rate of the fluid flowing through the flow path 1 in such a manner that a position of an internal valve element is controlled by voltage applied by, for example, a piezo element, and an opening level between a valve seat and the valve element is appropriately changed. That is, the flow rate control valve 2 can make a change from a state where the flow path 1 is closed to completely stop the fluid flowing to a state where the flow path 1 is fully opened to make the fluid substantially freely flow without resistance.

The first pressure sensor 31, fluid resistor 32, and second pressure sensor 33 are used as devices for measuring the flow rate of the fluid flowing through the flow path 1. The fluid resistor 32 is, for example, a laminar flow element that is configured to stack a plurality of rectangular thin plates to make the fluid flowing inside form a laminar flow. The laminar flow element is fitted into a concave portion of the attachment surface BP, and fixed by being pressed by the first pressure sensor 31 from an upper side thereof.

The first pressure sensor 31 and the second pressure sensor 33 are intended to measure a pressure change caused by the fluid resistor 32, and respectively measure pressures on upstream and downstream sides of the fluid resistor 32.

Figure 3:
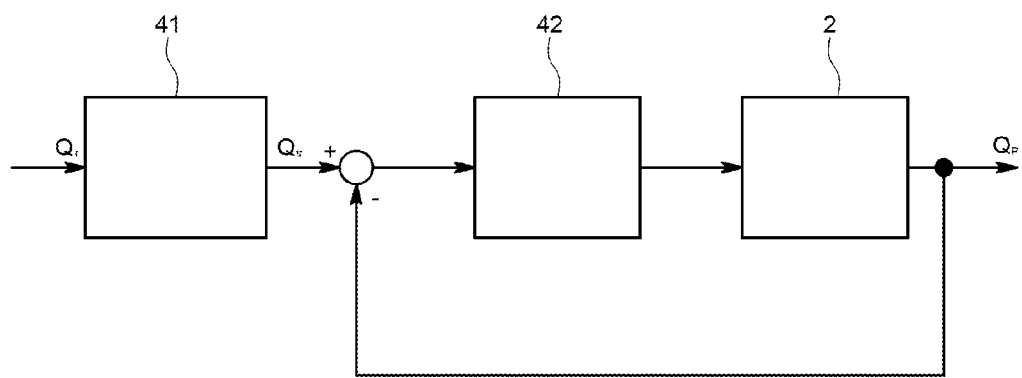
FIG. 3 is a schematic block diagram illustrating a control configuration of the flow rate controller of the first embodiment.

The information processing mechanism 10 is contained in an upper space of the casing C, and is configured to physically include a CPU, a memory, an I/O channel, an A/D converter, a D/A converter, and other analog or digital electric circuits, wherein the CPU and the other peripheral devices cooperatively operate according to a program stored in the memory, and carry out functions including at least the functions of the a flow rate calculation part 34, and a setting flow rate shaping part 41 and a valve control part 42, each of which is also illustrated in a control block diagram of FIG. 3.

First, the flow rate calculation part 34 will be described. The flow rate calculation part 34 is one that receives pressure measurement signals from the first and second pressure sensors 31 and 33, and on the basis of values of the signals and preliminarily stored fluid resistor characteristics of the fluid resistor 32, calculates and outputs a mass or volumetric flow rate of the fluid flowing through the flow path 1. In other words, the first pressure sensor 31, laminar flow element, second pressure sensor 33, and flow rate calculation part 34 cooperatively operate to thereby constitute a pressure type flow rate sensor 3 for measuring the flow rate of the fluid flowing through the flow path 1. A measured flow rate $Q_p$ outputted from the flow rate calculation part 34 is fed back to the valve control part 42, and used for the flow rate control.

The setting flow rate shaping part 41 is one that, in the case where an input setting flow rate $Q_r$ inputted by a user has a discontinuous point, converts the input setting flow rate $Q_r$ to a shaped setting flow rate $Q_{tr}$ that is appropriate to make an overshoot amount and target response time of the flow rate of the fluid actually flowing have desired values, wherein the flow rate continuously changes. In other words, the setting flow rate shaping part 41 is one that, in the case where, in the input setting flow rate $Q_r$, an absolute value of a deviation between respective target values from a first target value to a second target value changes by a reference value or more within a reference time, on the basis of the input setting flow rate $Q_r$, outputs the shaped setting flow rate $Q_{tr}$ appropriate for flow rate control characteristic of the flow rate controller 100.

More specifically, the setting flow rate shaping part 41 is configured to, for example, in the case of receiving the input setting flow rate $Q_r$ of which a target value largely changes within the reference time, output the shaped setting flow rate formed with a continuously changing interval in which a continuous change from the first target value $r_1$ to the second target value $r_2$ is made over a predetermined period of time.

That is, the setting flow rate shaping part 41 is configured to, in the case of receiving the input setting flow rate $Q_r$ having a discontinuous point across which the target value discontinuously changes from the first target value $r_1$ to the second target value $r_2$ with time, output the shaped setting flow rate $Q_{tr}$ in which the continuously changing interval in which the target value continuously changes from the first target value $r_1$ to the second target value $r_2$ over the predetermined period of time is inserted in place of the discontinuous point.

Figure 4:
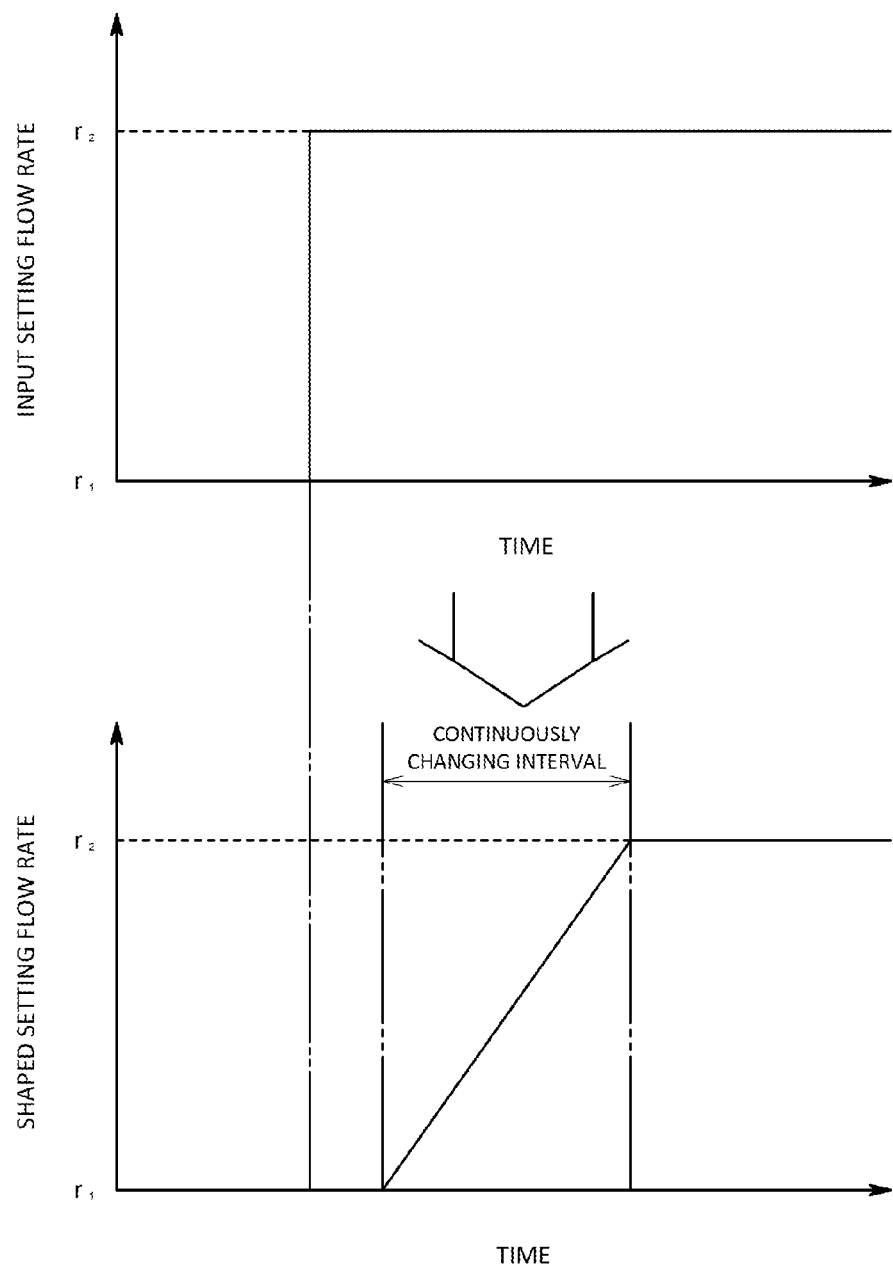
FIG. 4 is a schematic graph illustrating operation at the time when a setting flow rate shaping part of the first embodiment forms a shaped setting flow rate from an input setting flow rate.

The first embodiment is based on the assumption that as the input setting flow rate $Q_r$, a step function that, as illustrated in a graph of FIG. 4, discontinuously changes such that in an initial state, a flow rate as the first target value $r_1$ is zero, and at a predetermined time, a flow rate takes the predetermined second target value $r_2$ is inputted. In the case of receiving such an input setting flow rate $Q_r$, the setting flow rate shaping part 41 outputs the shaped setting flow rate $Q_{tr}$ in which the input setting flow rate $Q_r$ is converted such that as illustrated in FIG. 4, in place of the discontinuous point, the continuously changing interval is inserted to make the target value continuously change between zero and the second target value $r_2$. Note that the reason why a starting point of the continuously changing interval of the shaped setting flow rate is displaced from the discontinuous point of the input setting flow rate by a predetermined time is because a calculation time necessary to set the target value in the continuously changing interval appears as a time delay.

The setting flow rate shaping part 41 is configured to set a time length of the continuously changing interval to the predetermined period of time on the basis of a target response time during which the actual flow rate changes from the transient response state to a stable state of being substantially stabilized at the second target value $r_2$, and also make a continuous connection between the first target value $r_1$ and the second target value $r_2$ with a linear expression using time as a variable to provide an output as the shaped setting flow rate $Q_{tr}$. In other words, the setting flow rate shaping part 41 provides a target value change expressed by a ramp function (linear function) in place of the discontinuous point in the input setting flow rate $Q_r$ to eliminate an abrupt change in target value, and thereby makes it easy to make the actual flow rate more stably follow the target value and achieve the target overshoot amount and response time.

Figure 5:
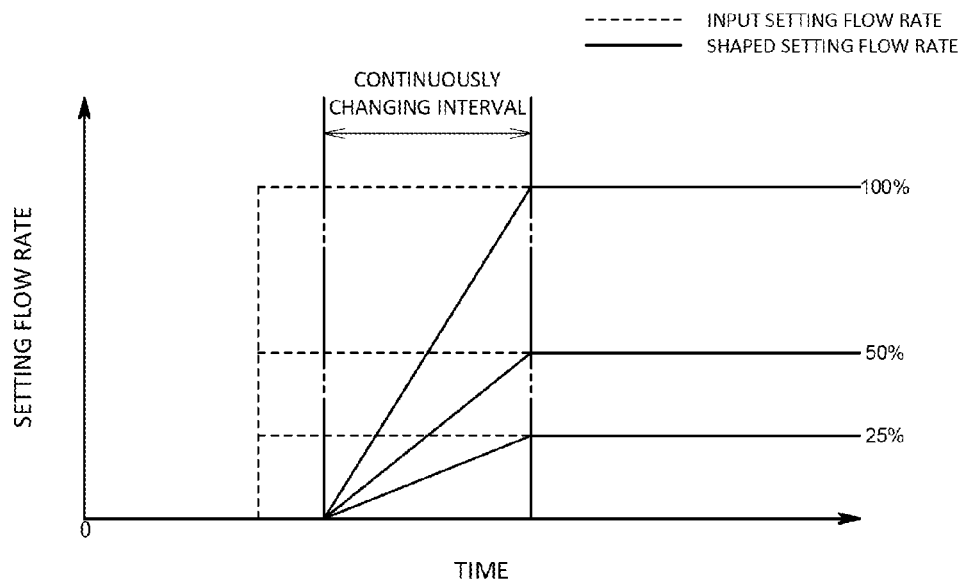
FIG. 5 is a schematic graph illustrating the case where the setting flow rate shaping part of the first embodiment changes a slope of a target value in a continuously changing interval depending on a difference in final target value.

Further, depending on an absolute value of a deviation between the first and second target values $r_1$ and $r_2$ of the inputted setting flow rate $Q_r$ received as illustrated in FIG. 5, the setting flow rate shaping part 41 sets an absolute value of an amount of change in target value per unit time in the continuously changing interval.

More specifically, as illustrated in FIG. 5, in the first embodiment, the first target value $r_1$ as the initial state is zero, which is common, and therefore the setting flow rate shaping part is adapted to, as the magnitude of the second target value $r_2$ as a final target value is increased, increase a slope of the ramp function in the continuously changing interval, and thereby increase the amount of change in target value per unit time to output the shaped setting flow rate $Q_{tr}$ as the magnitude of the second target value $r_2$ is increased. Note that the first embodiment intends to make the target response time, which is a target value of a period of time necessary to change from the transient response state to the stable state, fall within a substantially constant time regardless of the final target value, and therefore for any second target value $r_2$, the time length of the continuously changing interval is made substantially the same.

Figure 6:
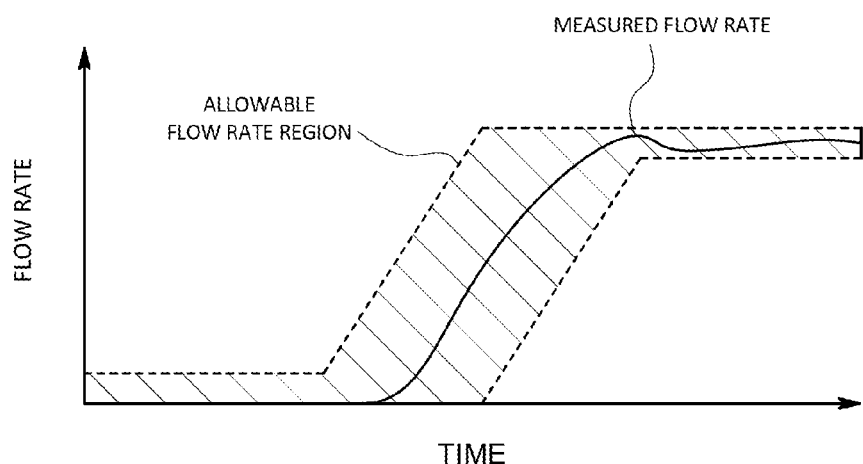
FIG. 6 is a schematic graph illustrating a relationship between an actual flow rate of fluid controlled by the flow rate controller of the first embodiment and an allowable flow rate region.

More specifically, the setting flow rate shaping part 41 is configured to, as illustrated in a conceptual graph of FIG. 6, in the continuously changing interval, set an amount of change in target value per unit time at the time when the measured flow rate $Q_p$ measured by the flow rate sensor is included within an allowable flow rate region prescribed by upper and lower limit flow rate values at each time. That is, for the magnitude of the slope of the ramp function, which indicates the amount of change in target value per unit time in the continuously changing interval, a value meeting the condition that a graph of a time rate of change in actual flow rate is included within the allowable flow rate region determined on the basis of a required step response range has already been examined for each final target value by experiment or the like. The first embodiment is adapted to, among predetermined time lengths meeting the condition that the measured flow rate $Q_p$ is included within the allowable flow rate region, set respective final target values during the length of the continuously changing interval to thereby make target response times substantially equal.

Also, as is clear from the above-described configuration, in the case where no discontinuous point is present in the input setting flow rate $Q_r$, the setting flow rate shaping part 41 is configured to directly output the inputted input setting flow rate $Q_r$ as the shaped setting flow rate $Q_{tr}$.

Note that a discontinuous change in target value in the case of digital control means that between adjacent control cycles, an absolute value of a difference in target value becomes a value equal to or more than a prescribed value. Also, a continuous change in target value means that an absolute value of a difference between respective adjacent target value in each control cycle becomes less than the prescribed value. That is, in this specification, even for the case where the input setting flow rate $Q_r$ and the shaped setting flow rate $Q_{tr}$ are not functions of time but represented as point sequences with respect to time, respectively, the above-described concept of continuity/discontinuity may be utilized.

The valve control part 42 is one that controls the opening level of the flow rate control valve 2 by controlling voltage applied to the flow rate control valve 2 by performing feedback control so as to reduce a deviation between the shaped setting flow rate $Q_{tr}$ outputted from the setting flow rate shaping part 41 and the measured flow rate $Q_p$ measured by the flow rate sensor. For example, the valve control part 42 is one that controls the opening level of the flow rate control valve 2 by PID control, and PID parameters are not changed depending on the magnitude of the second target value $r_2$ as the final target value of the input setting flow rate $Q_r$, but used as fixed values. In some cases, by appropriately changing the PID parameters depending on the magnitude of the second target value $r_2$, flow rate control characteristics may be improved.

As described, according to the flow rate controller 100 of the first embodiment, in the stepwise input setting flow rate $Q_r$ inputted by the user, the setting flow rate shaping part 41 inserts the continuously changing interval in which the target value changes rampwise in place of the discontinuous point, and also outputs the shaped setting flow rate $Q_{tr}$ in which a value of the second target value $r_2$ as the final target value is increased, a time rate of change in target value in the continuous changing interval is set larger, and therefore the period of time necessary for the flow rate of the fluid actually flowing through the flow path 1 to change from the transient response state to the stable state can be kept substantially constant.

Also, the time rate of change in target value in the continuously changing interval is preliminarily obtained for each final target value by experiment so as to meet stability, the overshoot amount, and the target response time, and therefore even in the case where any input setting flow rate $Q_r$ is inputted by the user, the feedback based on the shaped setting flow rate $Q_{tr}$ and the measured flow rate $Q_p$ enables the flow rate control to be constantly performed within the predetermined allowable flow rate region.

Further, in the first embodiment, only by converting the input setting flow rate $Q_r$ inputted by the user to the shaped setting flow rate $Q_{tr}$, a response of the actual measured flow rate $Q_p$ can be made desirable, and therefore, for example, by adjusting the PID parameters in the valve control part 42, the flow rate control characteristics can also be further improved.

Next, a flow rate controller 100 of a second embodiment is described. Note that members corresponding to those in the first embodiment are affixed with the same letters or numerals.

The setting flow rate shaping part 41 of the first embodiment is configured to, depending on the second target value $r_2$ as each final target value, modify the time rate of change in target value in the continuously changing interval, and also in the case where some second target value $r_2$ is given, keep the time rate of change in target value in the continuously changing interval always constant to keep the slope in the continuously changing interval always constant; however, the setting flow rate shaping part 41 of the second embodiment is configured to, under a predetermined condition, change a slope in a continuously changing interval.

That is, as an absolute value of a deviation between the first and second target values $r_1$ and $r_2$ is increased, the setting flow rate shaping part 41 of the second embodiment increases a time rate of change in target value in at least a part of the continuously changing interval depending on an absolute value of each deviation. Further, the setting flow rate shaping part 41 is configured to, at a point of time when the measured flow rate $Q_p$ measured by the flow rate sensor reaches a threshold flow rate value after flow rate control based on the target value in the continuously changing interval has been started, changes an absolute value of a slope of a linear expression representing the time change in target value.

Figure 7:
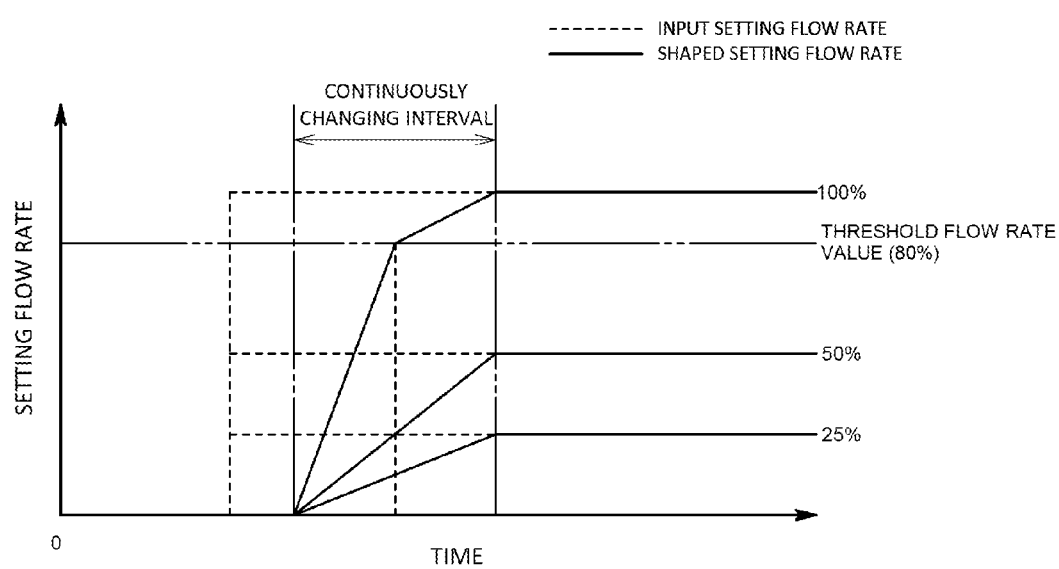
FIG. 7 is a schematic graph illustrating a way for a setting flow rate shaping part in a second embodiment of the present invention to change a target value in a continuously changing interval.

More specifically, as illustrated in FIG. 7, in the case where the first target value $r_1$ as an initial state is 0%, and the second target value $r_2$ as the final target value is set to 100%, when the measured flow rate $Q_p$ reaches 80% as the threshold flow rate value after the flow rate control to the target value in the continuously changing interval has been started, the setting flow rate shaping part 41 changes a slope in a latter part of the continuously changing interval so as to become small as compared with a slope in a first part. That is, during a period of time from the start of the continuously changing interval to a time when the measured flow rate $Q_p$ reaches the threshold flow rate value, the slope of the linear expression representing the time change in target value is set very large to increase a response speed, whereas after the threshold flow rate value has been exceeded, in order to suppress an overshoot amount to more improve stability, the slope of the linear expression representing the time rate of change in target value is decreased to gently converge to the final target value.

Also, in the case where a smaller value than the threshold flow rate value is set as the second target value $r_2$ as the final target value, as illustrated in FIG. 7, the setting flow rate shaping part 41 is configured to keep the slope of the linear expression representing the time change in target value always constant in the continuously changing interval.

As described, the flow rate controller 100 of the second embodiment is configured to, in the case where a deviation between the first and second target values $r_1$ and $r_2$ is larger than the predetermined value, at a point of time as a boundary when an actually flowing flow rate exceeds the threshold flow rate value, change the time rate of change in target value in the continuously changing interval from a large state to a small state, and therefore even in the case of flowing a large flow rate from a state where nothing flows, a response time can be largely shortened and also the overshoot amount can be reduced.

A variation of the second embodiment is described. Timing at which the time rate of change in target value in the shaped setting flow rate $Q_{tr}$ changes may be determined not on the basis of the measured flow rate $Q_p$. For example, the present invention may be configured to output the shaped setting flow rate $Q_{tr}$ from the setting flow rate shaping part 41 such that a target value at a point of time when time passes by a predetermined ratio with respect to a time length of the continuously changing interval becomes equal to the threshold flow rate value.

Other embodiments are described.

In each of the above-described embodiments, the amount of change in target value per unit time in the continuously changing interval of the shaped setting flow rate outputted by the setting flow rate shaping part is changed on the basis of the slope of the linear expression representing the time rate of change or the time change in target value; however, the present invention may change it simply on the basis of a difference or ratio between respective adjacent target values. Also, the setting flow rate shaping part inserts the continuously changing interval in place of the discontinuous point of the input setting flow rate, and by displacing the originally existing second target value backward by the time length of the continuously changing interval, forms the shaped setting flow rate; however, for example, the present invention may change part of an initial interval in which a target value is kept constant at the second target value to a continuously changing interval to form a shaped setting flow rate.

Figure 8:
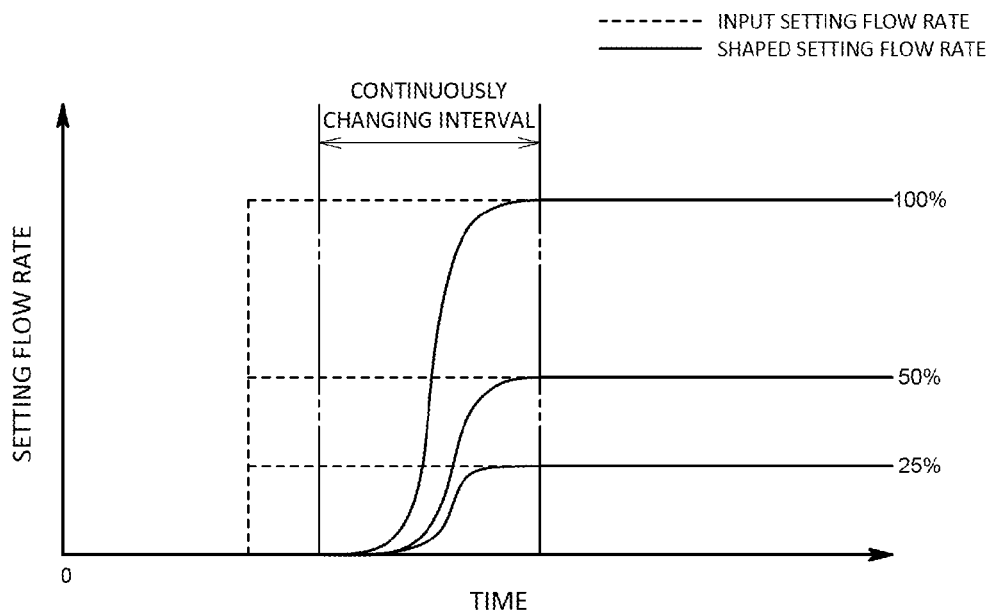
FIG. 8(a) includes a schematic graph illustrating a way of setting flow rate shaping parts in other embodiments to change target values in continuously changing intervals, respectively.
FIG. 8(b) includes a schematic graph illustrating a way of setting flow rate shaping parts in other embodiments to change target values in continuously changing intervals, respectively.
Figure 8:
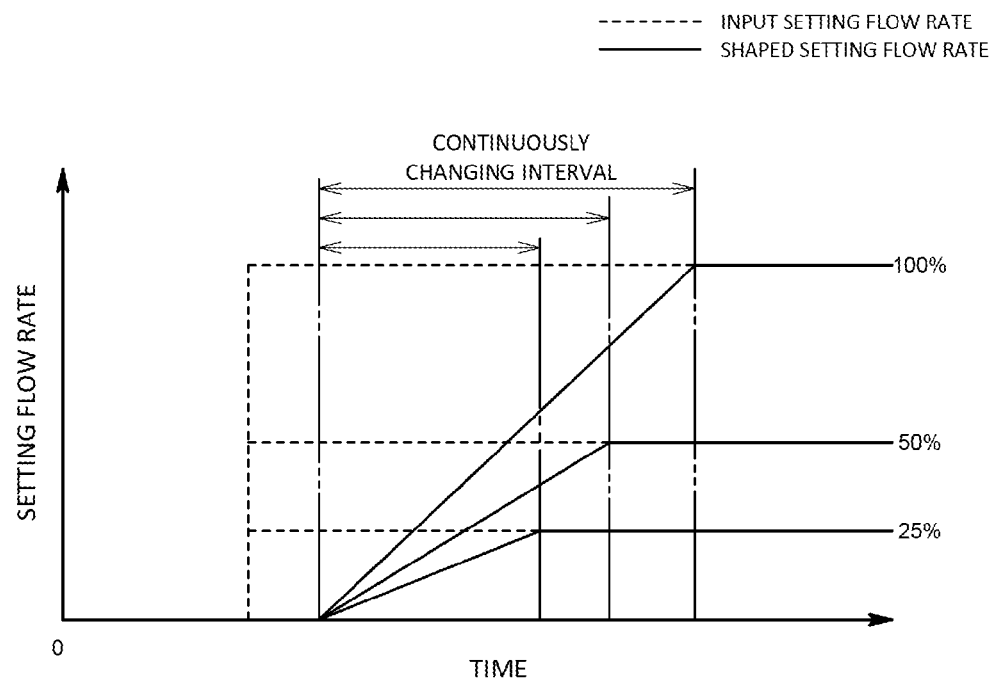

More specifically, as illustrated in FIG. 8(a), the setting flow rate shaping part may be configured to, at starting and ending points of the continuously changing interval, perform sigmoidal interpolation, and also change an absolute value of an amount of change in target value per unit time at a central part of the continuously changing interval depending on the magnitude of the second target value as a final target value.

Also, as illustrated in FIG. 8(b), the setting flow rate shaping part may be configured to, depending on the magnitude of each of second target values, change a length of the continuously changing interval to set a time rate of change in target value according to the second target value. More specifically, the present invention may be adapted to, for example, by setting the length of the continuously changing interval longer with increasing the second target value, increase a slope of a linear expression representing each time change in target value with increasing the second target value.

In each of the above-described embodiments, the first target value as the initial state is fixed to 0%; however, for example, the present invention may set, as the first target value, a state where some low flow rate such as 10% or 20% is kept constant. Even in such a case, according to the flow rate controller of the present invention, by changing the amount of change in target value per unit time in the continuously changing interval depending on the deviation between the first and second target values, preferable flow rate control can be performed even in the case where any input setting flow rate is inputted.

Further, in each of the above-described embodiments, the flow rate control in a direction to increase the flow rate is described; however, similarly, the present invention can also be applied to the case of decreasing the flow rate from some flow rate to another flow rate. In this case, as an absolute value of a deviation between the first and second target values is increased, i.e., as the second target value is decreased with respect to the first target value, it is only necessary to increase an amount of time change in target value in a continuous changing interval of a shaped setting flow rate. In doing so, similarly to the case of increasing the flow rate, even in the case of providing any target value change, a measured flow rate actually measured can be made to fall within a target response range.

Also, if a program for an existing flow rate controller is updated with a recording medium that is recorded with a program including the setting flow rate shaping part and valve control part as described above, an effect of the present invention can also be added to the existing flow rate controller by retrofitting.

In addition, it is only necessary that the continuously changing interval in which the target value continuously changes from the first target value to the second target value over the predetermined period of time is a set of the cases in each of which an absolute value of a deviation between respective adjacent target values becomes equal to or less than the reference value within the reference time. For example, even in the case where an amount of time change and an amount of change in target value between some adjacent target values are respectively $\Delta t_a$ and $\Delta r_a$, and an amount of time change and an amount of change in target value between other adjacent target values are respectively $\Delta t_b$ and $\Delta r_b$, which are respectively different from each other, in the case where $\Delta t_a$ and $\Delta t_b$ are within the reference time, and absolute values of the amounts of changes in target value $\Delta r_a$ and $\Delta r_b$ are equal to or less than the reference value, the adjacent target values can be regarded as continuous, and treated as ones constituting a continuous changing interval. In other words, even in the case where an amount of time change or amount of change in target value between adjacent target values is large only in a part, in the case where the amount of time change and the amount of change in target value are respectively within the above-described reference time and reference value, the adjacent target values are ones that constitute part of the continuously changing interval.

A hardware configuration is not limited to that illustrated in each of the above-described embodiments. For example, arrangement order of the respective fluid control devices in the flow path is not limited to the illustrated arrangement, and the respective flow rate sensors may be arranged before the flow rate control valve. Also, the fluid resistor is not be limited to the laminar flow element, and a sonic nozzle or the like may be used. Further, in the case where a downstream side of the fluid resistor is kept, for example, substantially at vacuum, and pressure on the downstream side of the fluid resistor is kept at a substantially constant value and does not change, the second pressure sensor may be omitted to calculate the flow rate only from a pressure measured by the first pressure sensor.

In addition, the flow rate sensor is not limited to the pressure type described in each of the embodiments, and a thermal type flow rate sensor may be used.

Further, the present invention may be used not only for controlling flow rate controller but may also be used for controlling pressure. More specifically, the present invention may be one that is provided with: a pressure sensor; a pressure control valve; a setting pressure shaping part that, in the case of receiving a setting pressure value that discontinuously changes from a first target value to a second target value, outputs a shaped setting pressure formed with a continuously changing interval in which a continuous change is made from the first target value to the second target value over a predetermined period of time; and a valve control part that controls the pressure control valve on the basis of the shaped setting pressure and a measured pressure, wherein the setting pressure shaping part is configured to change an amount of change in target value per unit time in the continuously changing interval depending on the magnitude of an absolute value of a deviation between the first and second target values in the received input setting pressure. Also, in each of the embodiments, the shaped setting flow rate formed in response to the input setting flow rate illustrated in the drawing such as FIG. 5, 7, or 8, may be replaced with a shaped setting pressure, such that the present invention can be similarly realized even in a pressure controller.

Furthermore, the present invention is not limited to any of the illustrated examples, but can be variously modified without departing from the scope thereof.

INDUSTRIAL APPLICABILITY

By using the flow rate controller of the present invention, even in the case where any input setting flow rate is inputted by a user, transient response characteristics can be made to have a required accuracy, and therefore a component gas can be more precisely controlled in a semiconductor manufacturing process to manufacture a high quality semiconductor.

The invention claimed is:

1. A flow rate controller comprising:
a flow rate sensor that is provided in a flow path through which fluid flows;
a flow rate control valve that is provided in the flow path;
a setting flow rate shaping part that, in a case of receiving an input setting flow rate in which an absolute value of a deviation between a first target value and a second target value changes by a reference value or more within a reference time, outputs a shaped setting flow rate formed with an interval in which from the first target value to the second target value, a continuous change is made over a predetermined period of time; and
a valve control part that controls an opening level of the flow rate control valve so as to reduce a deviation between the shaped setting flow rate outputted from the setting flow rate shaping part and a measured flow rate measured by the flow rate sensor, wherein
the setting flow rate shaping part is configured to, depending on a magnitude of the absolute value of a deviation between the first target value and the second target value in the received input setting flow rate, change an amount of change in a target value per unit time in the interval.

2. The flow rate controller according to claim 1, wherein:
the setting flow rate shaping part is configured to, as the absolute value of the deviation between the first target value and the second target value in the received input setting flow rate is increased, increase an absolute value of the amount of change in target value per unit time in the interval.

3. The flow rate controller according to claim 1, wherein:
the target value in the interval is represented by a linear expression using time as a variable; and
the setting flow rate shaping part is configured to, as the absolute value of the deviation between the first target value and the second target value is increased, increase an absolute value of a slope of the linear expression.

4. The flow rate controller according to claim 3, wherein:
the setting flow rate shaping part is configured to, at a point of time when the measured flow rate measured by the flow rate sensor reaches a threshold flow rate value after flow rate control based on the target value in the interval has been started, change the absolute value of the slope of the linear expression.

5. The flow rate controller according to claim 1, wherein:
in the input setting flow rate, a target value changes stepwise; and
the setting flow rate shaping part outputs the shaped setting flow rate in which the target value in the interval changes rampwise.

6. The flow rate controller according to claim 1, wherein:
the setting flow rate shaping part is configured to, in the interval, set an amount of change in target value per unit time at a time when the measured flow rate measured by the flow rate sensor is included within an allowable flow rate region prescribed by an upper limit flow rate value and a lower limit flow rate value at each time.

7. A recording medium recorded with a program used for a flow rate controller comprising a flow rate sensor provided in a flow path through which fluid flows, and a flow rate control valve provided in the flow path, the program comprising:
a setting flow rate shaping part that, in a case of receiving an input setting flow rate in which an absolute value of a deviation between respective target values from a first target value to a second target value changes by a reference value or more within a reference time, outputs a shaped setting flow rate formed with a interval in which a target value continuously changes from the first target value to the second target value over a predetermined period of time; and
a valve control part that controls an opening level of the flow rate control valve so as to reduce a deviation between the shaped setting flow rate outputted from the setting flow rate shaping part and a measured flow rate measured by the flow rate sensor, wherein
the setting flow rate shaping part is configured to, depending on magnitude of an absolute value of a deviation between the first target value and the second target value in the received input setting flow rate, change an amount of change in target value per unit time in the interval.

* * * * *